June 24, 1930. O. V. PAYNE 1,766,836
WEFT DETECTOR FOR LOOMS
Filed April 6, 1928
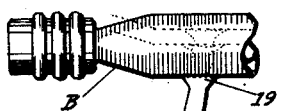
Fig. 1
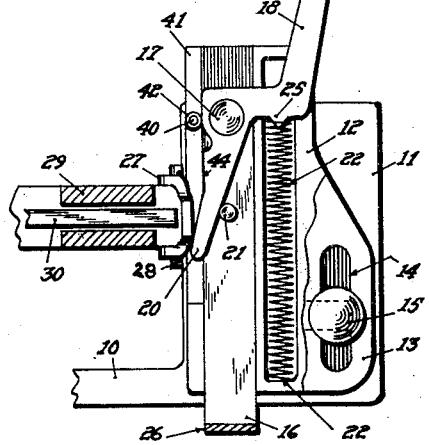
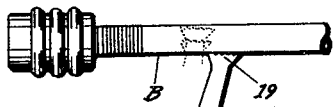
Fig. 3
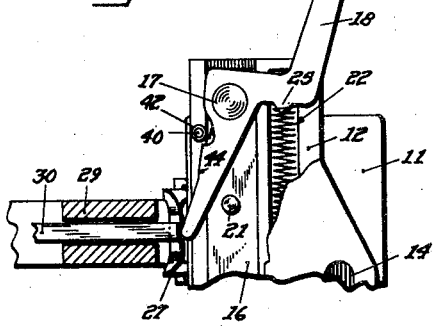
Fig. 4
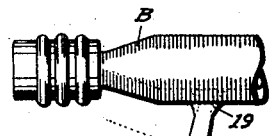
Fig. 2
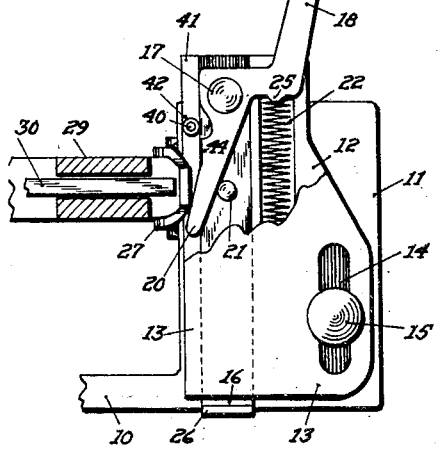
Fig. 5
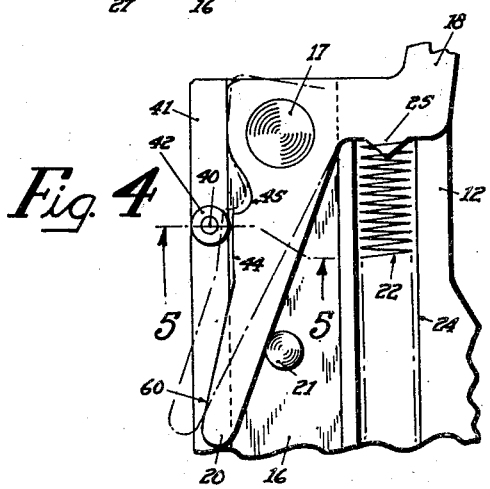
Inventor
Oscar V. Payne
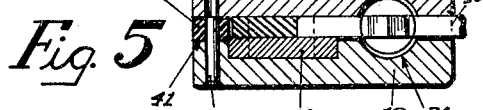
Attorneys Patented June 24, 1930

1,766,836

UNITED STATES PATENT OFFICE

OSCAR V. PAYNE, OF WORCESTER, MASSACHUSETTS, ASSIGNOR TO CROMPTON & KNOWLES LOOM WORKS, OF WORCESTER, MASSACHUSETTS, A CORPORATION OF MASSACHUSETTS

WEFT DETECTOR FOR LOOMS

Application filed April 6, 1928. Serial No. 267,959.

This invention relates to improvements in side slipping weft detectors and it is the general object of the invention to provide means to cause the teeth of the detector to be embedded in the yarn before the detector reaches the position in its forward movement where it is normally permitted to have an indicating movement.

In my co-pending application Serial No. 200,481 I have shown a side slipping weft detector including a yarn engaging element pivoted to a slide and having a forwardly extending tail to be operatively related to indicating mechanism. As shown in that application the detector may swing about its pivot when in rearmost position. Extensive use of the detector of this form shows that under certain conditions where the yarn is very hard it is desirable to give the detector opportunity to have the teeth thereof embedded in the yarn before the detector is capable of swinging to give an indication and it is accordingly an important object of my present invention to provide a relatively fixed device which will act on a part rigid with the yarn engaging element to prevent side slipping movement of the latter until the teeth of the detector have had an opportunity to enter the yarn.

It is a more particular object of my present invention to provide a small roll normally out of contact with the moving parts of the detector but positioned to prevent premature slipping of the detector along a hard mass of wound yarn.

In the embodiment of the invention set forth herein I employ a roll which may under certain conditions have contact with the detector as the latter moves back and forth in its support when detecting relatively coarse yarn. Under certain conditions there is no reason why the detector should be required to move forwardly before being able to swing on its pivot, as I have found that the detector operates satisfactorily as shown in the aforesaid application for softer yarns. It is a further object of my present invention to form the roll and that part of the detecting element which cooperates therewith in such proportions that the roll may be removed when the detector is to cooperate with softer yarns so that the detector will operate in substantially the same manner as shown in the aforesaid application.

With these and other objects in view which will appear as the description proceeds, my invention resides in the combination and arrangement of parts hereinafter described and set forth in the claims.

In the accompanying drawings, wherein I have shown a convenient embodiment of my invention, Fig. 1 is a top plan view of my invention, the cap of the detector housing being broken away and parts being in section for the sake of clearness, the detector being shown in forward position and in contact with a sufficient supply of weft, Fig. 2 is a view similar to Fig. 1 but with the detector in engagement with the yarn at the point in the forward advance of the yarn where side slipping of the detector element is possible, Fig. 3 is a view similar to Fig. 2 but with the yarn substantially exhausted and the detector moved along the bare bobbin to give an indication, Fig. 4 is an enlarged top plan view of a portion of Fig. 1 showing the parts in normal position, and Fig. 5 is a vertical detailed section on line 5—5 of Fig. 4.

Referring to the drawings, a detector stand 10 has a platform 11 on which is mounted the bed 12 of my detector. A cap 13 shown in Fig. 5 has a slot 14 which is in alignment with the corresponding slot in the bed. A bolt 15 extends through the slots and is secured to the platform. The bed has slidably mounted therein for movement toward and from the bobbin B a carrier 16 at the rear portion of which is an upstanding pivot stud 17. A yarn engaging weft detector element 18 is pivoted on the stud 17 and has a rearwardly extending offset yarn engaging roughened surface 19. Said element 18 has a forwardly extending tail 20 which is normally held in engagement with a stop pin 21 on the carrier 16.

A single compression spring 22 is confined in a cavity formed by grooves 23 and 24 formed in the cap and bed, respectively. Said spring bears against a portion 25 of the detecting element which is substantially parallel to the bobbin B and holds the tail 20 against the pin 21. The spring acts to hold the carrier and detector in rearmost position, movement to the rear being limited by an upwardly extending portion 26 which is in engagement with the cap.

Indication is communicated to the loom by means of a pivoted indicator 27 movable about a substantially fixed pivot pin 28. A portion of the stand 10 has a vertically extending slot 29 in which reciprocates an actuator lever 30. The indicator 27 is normally in the position shown in Fig. 1 to be out of the path of the actuator 30 so that the latter may descend without interruption. At the time of weft exhaustion the indicator will move to the position shown in Fig. 3 and interrupt downward movement of the actuator lever 30 to effect a change in the loom as set forth in patent to Ryon No. 1,030,748. For a further description of the structure and operation of the parts thus far described reference may be had to the aforesaid application and for the manner in which the indicator controls the operation of the loom reference may be had to the Ryon patent mentioned.

As previously stated it is desirable under certain conditions, especially when the detector is used in conjunction with hard yarn such as natural silk or rayon, to require the teeth of the detector to become sufficiently embedded in the yarn to prevent premature indication before the detecting element is capable of swinging on its pivot. In carrying my invention into effect to accomplish this result I provide the bed with a pin 40 which is driven into said bed and held in position by friction and project said pin above a horizontal surface 41 formed on a part of the bed. I then mount a small roll 42 on the upwardly extending end of the beam, the cap 13 serving to limit upward movement of the roll 42. An oil hole 43 may be provided in the cap if desired. By referring to Fig. 4 it will be seen that the tail 20 is provided with a surface 44 substantially parallel to the direction in which the carrier 16 slides and that said surface is spaced slightly from the roll 42.

In operation, the parts will be in the position shown in Fig. 4 before the detector is engaged by the bobbin, but as soon as the yarn or bobbin engages the surface 19 the latter will move forwardly. If the yarn is very hard or is of a very small diameter the detector may have a tendency to swing about its pivot 17, but such movement will be restrained by engagement of the surface 44 with the roll 42 during the first part of the forward movement of the detector, and during this movement the teeth of the latter will have an opportunity to become embedded in the yarn. As the detector continues its forward movement the straight surface 44 will pass in front of the pin 40 and the latter will be opposite a recess 45 lying to the rear of the surface 44. If yarn is present on the bobbin the teeth will have become sufficiently embedded therein so that the detector will not slide along the bobbin even though the yarn be very hard. When yarn is substantially exhausted, however, the detector will begin to move in a right hand direction as viewed in Fig. 1 about the stud 17 as soon as the straight surface 44 passes out of contact with the roll 42. The detector element 18 will thereupon swing about its pivot so that the roll 40 will occupy the recess 45. When in this position the tail 20 will move the indicator 27 from the position shown in Figs. 1 and 2 to the position shown in Fig. 3 to effect a change in the operation of the loom.

As shown in Fig. 5 the tail 20 has the lower surface thereof slightly above the surface 41 so that said tail will be free to move over the surface 41 without interference. The left hand edge 60 of the tail may be inclined as shown in Fig. 4 to insure sufficient movement on the part of the indicator 27 to accomplish the initiation of a change in the operation of the loom.

As previously suggested the detector may be used in connection with hard yarn at one time and with softer yarn at another time, but when cooperating with the softer yarns there is no need for preventing slipping movement of the detector during the very first of its forward movement because the yarns of softer character are found to accomplish this result. Under these conditions the cap 13 may be removed and the roll taken off the pin 40, after which the cap may be replaced and the detector will operate substantially as does the detector shown in my aforesaid application. In Fig. 4 I have shown in dot and dash lines the position which the tail 20 will assume when indicating substantial exhaustion of a bobbin wound with soft yarn when the roll 42 has been removed. It is desirable to have the pin 40 as near the normal rear position of the stud 17 as possible so that the diameter of said pin may be a maximum, but if for any reason the pin is moved forwardly from the position shown in Fig. 4 said pin may be made of smaller diameter so as not to interfere with the swing of the detector when the latter is cooperating with soft yarns.

From the foregoing it will be seen that I have provided a very simple means for requiring the teeth of the yarn engaging detector element to enter hard yarn before the detector reaches a point in its forward movement where it is permitted to move angularly to give an indication. It will also be seen that the roll is normally spaced from the surface 44 so that contact between said surface and the roll takes place only under such conditions as bring about a slight slipping movement on the part of the detector with respect to hard yarn. It will further be seen that the cap serves to restrain or limit movement of the roller and to hold the latter in position. Also, the roll and pin therefor are so proportioned and placed with respect to the stud 17 that the roll may be removed when the detector is to be used on softer yarn, in which case the detector will start to have an indicating movement as soon as it engages a depleted bobbin.

Having thus described my invention it will be apparent that changes and modifications may be made therein by those skilled in the art without departing from the spirit and scope of the invention and I do not wish to be limited to the details herein disclosed, but

What I claim is:

1. In a weft detector having an angularly movable side slipping yarn engaging detector element pivotally connected to a carrier slidable on a fixed support, a removable roll, a fixed guide pin for the roll, said roll effective to prevent premature angular movement of the detector at the beginning of the forward movement of the detector, and said pin being located so as to be out of the path of the detector to permit angular movement of the latter when the detector is in its rearmost position and the roll is removed.

2. In a weft detector having an angularly movable side slipping yarn engaging detector element pivotally connected to a carrier slidable on a fixed support, a removable roll, a fixed guide pin for the roll, said roll effective to prevent premature angular movement of the detector at the beginning of the forward movement of the detector, and said pin being located so as to be out of the path of the detector to permit angular movement of the latter when the detector is in its rearmost position and the roll is removed, and a removable cap secured to the support and serving to hold the carrier and removable stop in normal position.

3. In a weft detector having an angularly movable side slipping yarn engaging detector element pivotally connected to a carrier slidable on a fixed support, said detector having a forwardly extending tail with a recess therein, a removable stop, a holding element for the stop fixed with respect to the support, said stop being forward of the recess in the tail when the detector is in rearmost position to engage said tail during the first part of the forward movement of the detecting element and prevent premature angular movement of the latter, said holding element for the removable stop being spaced a sufficient distance from adjacent portions of the tail to permit angular movement of the detector at the beginning of the forward movement of said detecting element when the stop is absent.

4. A weft detector having an angularly movable side slipping yarn engaging detector element to engage a supply of weft and move forwardly therewith, means to impose a restraining force upon the detector element to prevent the same from premature angular movement during the first part of the forward movement thereof with the weft, and means effective during the continued movement of the detector element to thereafter effect a sudden release of the restraining force, said last named means including a surface having two portions extending in two different directions, the direction of one portion being such that its major component is parallel to the direction of movement of the carrier, and the direction of the other portion being such that its major component is transverse of the direction of movement of the carrier.

5. A weft detector having an angularly movable side slipping yarn engaging detector element to engage a supply of weft and move forwardly therewith, means to impose a restraining force upon the detector element to prevent the same from premature angular movement during the first part of the forward movement thereof with the weft, and means effective during the continued movement of the detector element to thereafter effect a sudden release of the restraining force, said last named means including a surface extending substantially parallel to the direction of movement of the carrier, said surface terminating abruptly to release the first named means.

6. In a weft detector having an angularly movable side slipping yarn engaging detector element pivotally connected to a carrier slidable on a fixed support, a stop element on the support to engage and restrain angular movement of the detector element during the first part of the forward movement of said element after engagement with the surface being detected to prevent premature indication of weft exhaustion, said elements having surfaces with engaging portions extending in the direction of movement of the carrier, each of said surfaces having a releasing portion extending transversely of the direction of movement of the carrier the detector element having the restraint on its angular movement suddenly released when the engaging portion of its said surface reaches the releasing portion of the said surface of the other element as the carrier moves forwardly.

7. In a weft detector having an angularly movable side slipping yarn engaging detector element pivotally connected to a carrier slidable on a fixed support, said detector having a forwardly extending tail with a portion substantially parallel to the direction in which the carrier moves when the detector is in non-indicating position, a stop element normally slightly spaced from said portion of the tail but positioned to be engaged by said portion of the detector during the first part of the forward movement of the detector to prevent premature indication, should the detector slip on a sufficient supply of weft, said tail having a recess to receive the stop and effect a sudden release of the restraint against angular movement of the detector element imposed thereon by the stop as the carrier reaches a predetermined point in its forward movement.

In testimony whereof I have hereunto affixed my signature.

OSCAR V. PAYNE.